United States Patent
Coots

(10) Patent No.: US 12,247,357 B2
(45) Date of Patent: *Mar. 11, 2025

(54) TIE PLATE DISPENSER AND METHOD THEREFORE

(71) Applicant: B & B Metals, Inc., Shephersville, KY (US)

(72) Inventor: Coty T. Coots, Shepherdsville, KY (US)

(73) Assignee: B & B Metals, Inc., Shepherdsville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,338

(22) Filed: Dec. 22, 2023

(65) Prior Publication Data

US 2024/0125054 A1 Apr. 18, 2024

Related U.S. Application Data

(63) Continuation of application No. 18/069,869, filed on Dec. 21, 2022, now Pat. No. 11,885,074, which is a continuation of application No. 16/910,918, filed on Jun. 24, 2020, now Pat. No. 11,578,464.

(51) Int. Cl.

| | |
|---|---|
| *E01B 29/32* | (2006.01) |
| *B65G 15/12* | (2006.01) |
| *B65G 43/08* | (2006.01) |
| *B65G 47/14* | (2006.01) |
| *B65G 47/244* | (2006.01) |

(52) U.S. Cl.
CPC .............. *E01B 29/32* (2013.01); *B65G 15/12* (2013.01); *B65G 43/08* (2013.01); *B65G 47/1485* (2013.01); *B65G 47/244* (2013.01); *B65G 2201/02* (2013.01); *B65G 2203/042* (2013.01)

(58) Field of Classification Search
None
See application file for complete search history.

(56) References Cited

U.S. PATENT DOCUMENTS

| | | |
|---|---|---|
| 3,690,264 A | 9/1972 | Plasser |
| 3,701,320 A | 10/1972 | Fearon |
| 3,731,455 A | 5/1973 | Theurer |
| 4,241,663 A | 12/1980 | Lund et al. |
| 4,522,323 A | 6/1985 | Labounty |
| 4,722,283 A | 2/1988 | Holley |
| 5,048,424 A | 9/1991 | Madison |
| 6,807,909 B1 | 10/2004 | Coots |

(Continued)

FOREIGN PATENT DOCUMENTS

| | | |
|---|---|---|
| CA | 2565458 A1 | 5/2007 |
| CA | 2644242 A1 | 5/2009 |

(Continued)

OTHER PUBLICATIONS

U.S. Appl. No. 16/418,155, filed May 21, 2019 May 21, 2019.

(Continued)

*Primary Examiner* — Kavel Singh
(74) *Attorney, Agent, or Firm* — Dinsmore & Shohl LLP

(57) ABSTRACT

Present embodiments relate to a tie plate dispenser which selectively changes the orientation of the tie plates being ejected, if needed. An actuator is used to flip the tie plate as it falls from an ejection location of the dispenser.

15 Claims, 9 Drawing Sheets

(56) References Cited

U.S. PATENT DOCUMENTS

| | | |
|---|---|---|
| 7,406,919 B2 | 8/2008 | Coots |
| 7,827,916 B2 | 11/2010 | Coots |
| 8,166,883 B1 | 5/2012 | Coots |
| 8,316,774 B1 | 11/2012 | Coots |
| 8,393,846 B1 | 3/2013 | Coots |
| 8,443,733 B2 | 5/2013 | Coots |
| 8,459,924 B1 | 6/2013 | Coots |
| 8,528,484 B2 | 9/2013 | Helmick |
| 8,636,460 B1 | 1/2014 | Coots |
| 8,794,423 B2 | 8/2014 | Sasstamo et al. |
| 9,016,208 B2 | 4/2015 | Coots |
| 9,038,542 B2 | 5/2015 | Coots |
| 9,328,465 B1 | 5/2016 | Coots |
| 9,422,673 B2 | 8/2016 | Coots |
| 9,446,662 B2 | 9/2016 | Coots |
| 9,745,132 B2 | 8/2017 | Coots |
| 9,745,150 B2 | 8/2017 | Coots |
| 9,752,286 B2 | 9/2017 | Coots |
| 10,094,071 B2 | 10/2018 | Coots |
| 10,112,215 B1 | 10/2018 | Coots |
| 10,316,471 B2 | 6/2019 | Coots |
| 10,329,100 B1 | 6/2019 | Coots |
| 10,427,876 B2 | 10/2019 | Coots |
| 11,427,408 B2 | 8/2022 | Coots |
| 11,578,464 B2 | 2/2023 | Coots |
| 11,885,074 B2 * | 1/2024 | Coots ................ B65G 15/12 |
| 2017/0349377 A1 | 12/2017 | Coots |
| 2019/0153678 A1 | 5/2019 | Coots |
| 2020/0141065 A1 | 5/2020 | Coots |
| 2021/0404122 A1 | 12/2021 | Coots |
| 2022/0411199 A1 | 12/2022 | Coots |
| 2023/0121877 A1 | 4/2023 | Coots |
| 2024/0076138 A1 | 3/2024 | Coots |

FOREIGN PATENT DOCUMENTS

| | | |
|---|---|---|
| CA | 2468106 A1 | 6/2009 |
| CA | 2810688 A1 | 9/2013 |
| CA | 2814607 A1 | 4/2014 |
| CA | 2843094 A1 | 8/2014 |
| CA | 3024667 A1 | 5/2019 |
| CA | 3060645 A1 | 5/2020 |
| CA | 3122448 A1 | 12/2021 |

OTHER PUBLICATIONS

U.S. Appl. No. 16/433,720, filed Jun. 6, 2019 Jun. 6, 2019.
Canadian Patent Application No. 3046462 filed on Jun. 14, 2019 Jun. 14, 2019.
Canadian Patent Application No. 3060645 filed on Oct. 29, 2019 Oct. 29, 2019.
Canadian Patent Application No. 3,122,448 filed on Jun. 15, 2021 Jun. 15, 2021.
U.S. Appl. No. 16/664,333, filed Oct. 25, 2019 Oct. 25, 2019.
U.S. Appl. No. 16/910,918, filed Jun. 24, 2020 Jun. 24, 2020.
Canadian Patent Office, Examiners Report issued in Application No. 3,122,448, 4 pages, dated Dec. 1, 2022 Dec. 1, 2022.
Canadian patent Office, Examiner's Report issued in Application No. 3,060,645, 3 pages, dated Feb. 15, 2024.

* cited by examiner

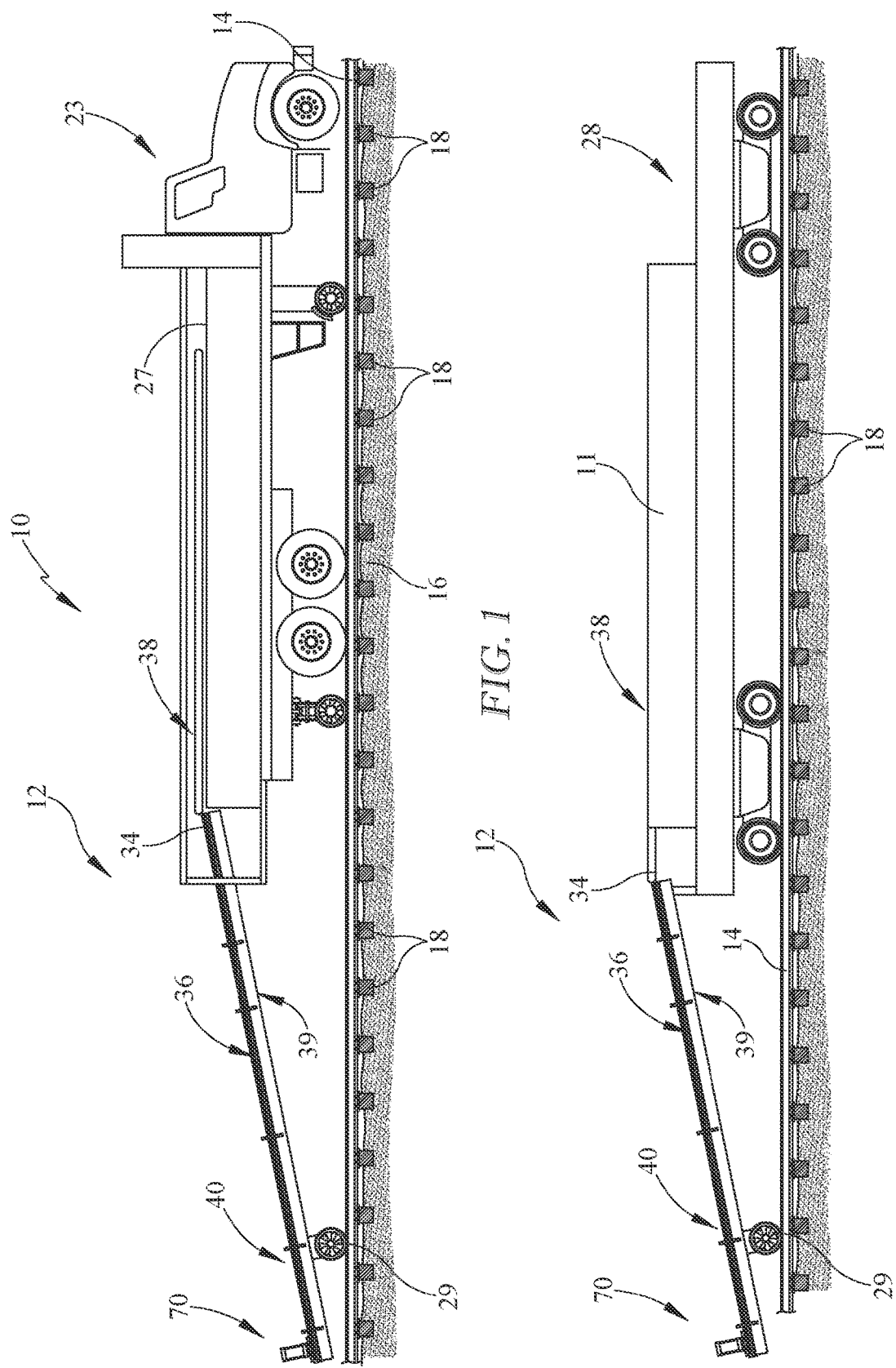

TIE PLATE DISPENSER AND METHOD THEREFORE

CLAIM TO PRIORITY

This continuation Patent application claims priority to and benefit of, under 35 U.S.C. § 120, to U.S. patent application Ser. No. 18/069,869, filed Dec. 21, 2022, which claims priority to U.S. patent application Ser. No. 16/910,918, filed Jun. 24, 2020, both titled, "Tie Plate Dispenser And Method Therefore", all of which is incorporated by reference herein.

BACKGROUND

1. Field of the Invention

Present examples relate to a tie plate dispenser and methods therefore. More specifically, present examples relate to embodiments for dispensing tie plates on or near rail road ties wherein the orientation of the tie plates may be adjusted.

2. Description of the Related Art

A railroad track assembly includes, in general, a plurality of railroad ties, each having a pair of tie plates. A rail track is disposed across each tie plate and run generally perpendicular to the railroad ties, to attach the tracks to the supporting tie. One skilled in the art will understand these railroad track assemblies.

During railroad maintenance, it is sometimes necessary that the tie plates are removed and replaced. The tie plates may be dispensed at various locations either on the railroad ties, between the railroad ties, or at the ends of the railroad ties.

The railroad maintenance may also require that the tie plates be oriented in a manner desired for the subsequent railroad maintenance crew. Thus once a tie plate is dispensed the subsequent crew may have to adjust the orientation, that is right side up if the tie plate is upside down when dispensed.

The information included in this Background section of the specification, including any references cited herein and any description or discussion thereof, is included for technical reference purposes only and is not to be regarded subject matter by which the scope of the invention is to be bound.

SUMMARY

Present embodiments relate to a tie plate dispenser which orients the tie plates during the dispensing process. The orientation may be width/length direction, upside down/right side up, or both.

According to some embodiments, a tie plate dispenser comprises a conveyor configured to move a plurality of tie plates, a conveyor frame which extends a preselected distance beyond an end of a conveying surface, the preselected distance defining an opening, at least one magnet disposed above the opening. The at least one magnet retains at least one of the plurality of tie plates over the opening. The at least one tie plate may be selectively released from said at least one magnet through said opening. An arm which actuates from a first position to a second position. In one of said first or second positions, the arm is retracted from a path in which said at least one tie plate falls, and in the other of the first or second positions the arm is extended to engage the at least one tie plate causing the at least one tie plate to flip when selectively released.

Some optional features may be utilized with the tie plate dispenser either alone or in combination with other embodiments. Such optional embodiments may include, but are not limited to the following. In some optional embodiments, the arm may be connected to a first actuator. The arm may further comprise a finger. The arm may be a first actuator which further comprises a finger. The first actuator may move horizontally. The horizontal move may be a forward-rearward direction, or said horizontal move is side-to-side. The arm may actuate by pivotal movement from said first position to said second position. The conveying surface may be defined by one of a roller conveyor, belt conveyor, gravity feed conveyor, a chute, a vibratory conveyor, or combinations of any of the foregoing. The at least one magnet may be a permanent magnet or an electromagnet. Where the at least one magnet is a permanent magnet, the tie plate dispenser may further comprise a second actuator to selectively disengage the at least one tie plate from the at least one magnet. The tie plate dispenser may further comprise a sensor to create a signal to release the at least one tie plate. The sensor may be above, below, or spaced from the opening. The sensor may detect a shoulder of said at least one tie plate.

In some other embodiments, a method of operating a tie plate dispenser may comprise magnetically supporting a tie plate at an end of a conveyor, sensing with a sensor a feature of the tie plate, determining an orientation of the tie plate, determining whether to extend an actuator based on said sensing, extending said actuator dependent upon said determining, selectively releasing the tie plate; and, changing the orientation of the tie plate upon said releasing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a tie plate dispenser and method will now be described by way of examples. These embodiments are not to limit the scope of the claims as other embodiments of a tie plate dispenser will become apparent to one having ordinary skill in the art upon reading the instant description. Non-limiting examples of the present embodiments are shown in figures wherein:

FIG. 1 is a side view of a tie plate distribution system; perspective view of a tie plate dispenser, including an example tie plate distributor or dispenser;

FIG. 2 is a side view of an alternative tie plate distribution system, including an example tie plate distributor or dispenser;

DETAILED DESCRIPTION

Figure 3:
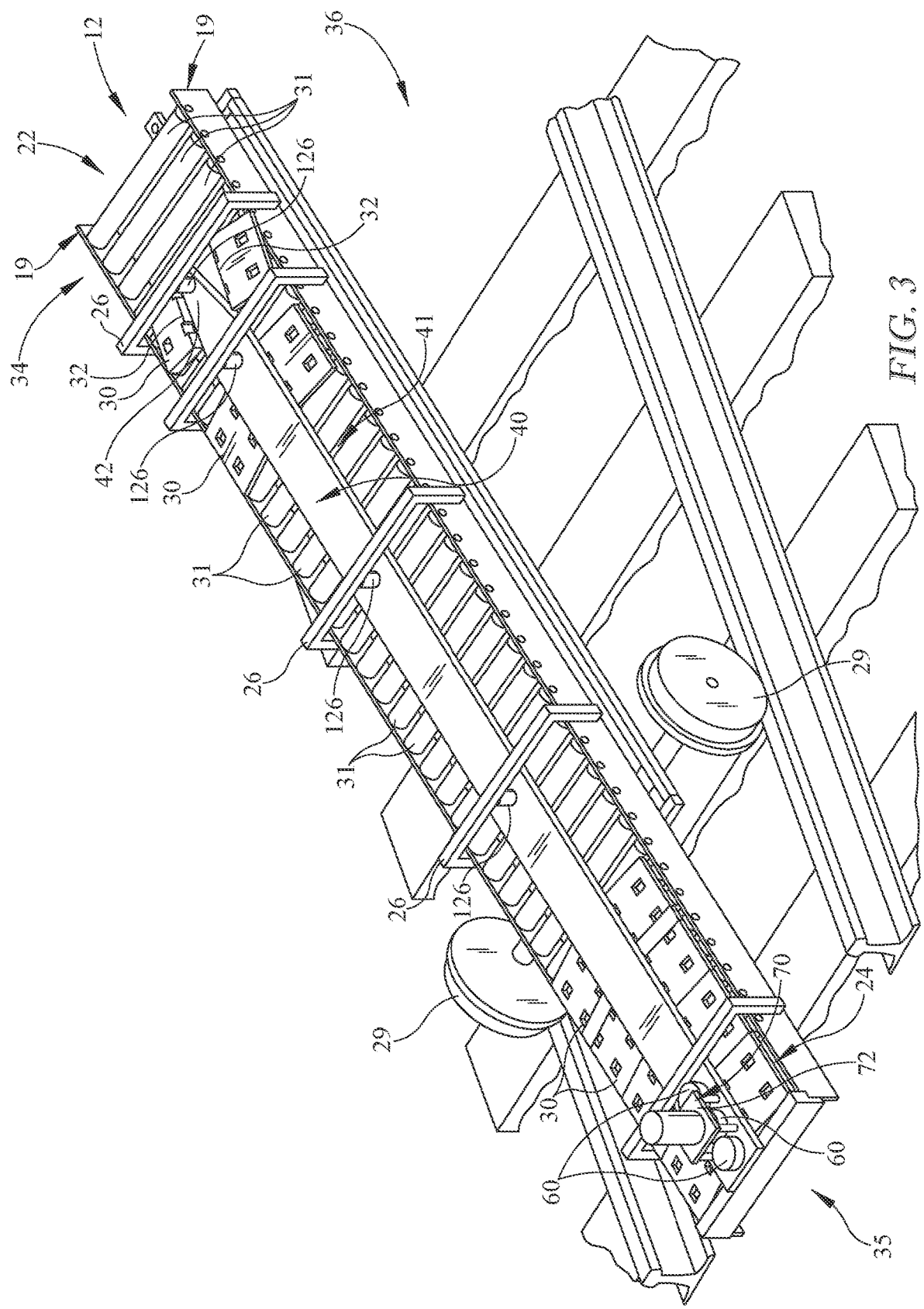
FIG. 3 is a perspective view of an example tie plate dispenser.

It is to be understood that a tie plate dispenser and method therefore is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring to FIGS. 1-10, the present embodiments provide a tie plate dispenser which dispenses or distributes tie plates along a railroad track assembly. The tie plates are advanced to an area of the dispenser where they are retained and selectively released at a desired time, location or both. The instant tie plate dispenser provides for structure which detects the orientation of a tie plate and based on that determination can change the orientation of the tie plate during the dispensing process, per the desire of the railroad or the maintenance group working on the railroad.

With reference to FIG. 1, a side view of a tie plate dispenser or distributor 12 is depicted. A carrier vehicle 10 is shown located on a railroad track 14 of a railroad track system. The tie plate distributor (also referred to as a tie plate dispenser) 12, is in feed communication with the tow vehicle 10 for working during railroad maintenance. Beneath the railroad track 14, a ballast 16 provides a substrate upon which a plurality of railroad ties 18 are disposed. The ballast 16 may be formed of rocks or other material which provides a stable base and allows for proper drainage. Further, the ballast 16 may have an upper elevation which raises the railroad to a height out of known flood plains. The railroad ties 18 are generally positioned about twenty-two inches (22") apart, as is known in the art however, alternative spacing may be utilized depending on the railroad operator and/or other factors. The railroad ties 18 are generally rectangular having a square cross-section as shown in FIG. 1. Disposed on an upper surface of each railroad tie 18 are a plurality of tie plates 30 (FIG. 3). The tie plates 30 are anchored to the railroad tie 18 and provide a place for positioning of the railroad track 14. Although a single track 14 is shown in the side view, as one skilled in the art will understand that in some embodiments, two tracks 14 are laid in parallel fashion and spaced apart at a preselected gauge distance providing the railroad track system. Also, in other embodiments, a single track may be utilized with a custom machine having supports of, for example, tracks or wheels on the side opposite the rail.

There is also shown in one embodiment, the tie plate distributor 12, for sequentially unloading railroad tie plates 30 (FIG. 3) from a suitable tie plate carrier, such as the railroad track mounted truck 10, as shown in FIG. 1, or a modified rail car 11 as shown in FIG. 2. The tie plate distributor 12 may be used with or on, either of the powered vehicle 10 or the rail car 11. As best shown in FIG. 3, the tie plate distributor 12 is adapted to deposit the tie plates 30 along a railroad tracks 14 of the railroad system. In some embodiments, it may be desirable to deposit one of the plates 30 along a centerline of the railroad track system on the railroad ties 18. In some other embodiments, it may be desirable to position the tie plates 30 on the railroad ties 18 near ends of the ties 18, or on the ballast 16 near ends of the railroad ties 18, if necessary. Conventionally, a straight portion of the railroad track 14 will have cross-ties 18 laid on longitudinal centerlines which are about twenty-two inches (22") apart, as measured along railroad track 14. As the tie plates 30 are deposited, one or more workmen who follow behind the distributor 12 may replace old tie plates on each individual tie 18 after the old railroad track 14 have been removed with the new tie plates 30, preparatory to placement of new rails or replacement of old railroad track 14 on the newly placed tie plates.

The tie plate dispenser 12 includes a first, tie plate loading end portion, which is mounted on the bed of the truck 23, for example, and a second, tie plate unloading end portion which is supported on railroad wheels 29, as best shown in FIGS. 1, 2 and 3. In the instant embodiment, the upper end of the dispenser 12 is an entrance for tie plates 30 and the lower end is a discharge end. The instant tie plate dispenser 12 sequentially moves the plurality of tie plates 30 from the first end to the second end by gravity feed from a higher first entrance end to a lower second discharge end 35.

The tie plate loading end portion of the tie plate dispenser 12 can include a conventional motorized endless belt conveyor, generally designated 36, for transporting the plates 30 rearwardly (from right to left, as viewed) from a front and mid-portion to a rear portion of the truck bed 27. The conveyor 36 can be positioned along the truck bed 27 so that a crane or other structure may be use to pick up tie plates 30 and deposit the tie plates 30 on the conveyor 36 for further processing. In other embodiments one or, perhaps, two workers standing on opposite sides of the conveyor 36, can alternatively pick up the tie plates 30 from storage along each side of the truck bed 27, place them on the moving belt conveyor 38 and, preferably, orient them for disposition on the railroad ties 18. Further, it should be understood that a hopper, conveyor or other mechanical or electromechanical device may be used to deliver the tie plates to the conveyor 36 or to the tie plate distributor 12.

A drive motor (not shown) for the belt conveyor 38 can be of the usual 12 VDC electric type so as to be energized by an engine driven electrical system of the truck 10. But, in order to avoid overtaxing a battery of the truck 10, it is also possible in some embodiments to use a separate gasoline powered motor/generator set to power a 120 VAC drive motor of the belt conveyor 38. Where the rail car 28 of FIG. 2 is used for carrying the loading end portion of the dispenser 12, a suitable gasoline powered motor/generator set, can also be used as a satisfactory energy source for the drive motor of the conveyor 36. The belt conveyor 38 delivers the tie plates 30 onto a first, upper input end 34 of a diagonally downwardly and rearwardly sloping gravity feed, roller conveyor, generally designated conveyor 36.

With reference now to FIG. 3, the conveyor 36 is removed from the truck 23 (FIG. 1) and the rail car 28 (FIG. 2). The slope of the conveyor 36 is suitable at about 10 to 40 degrees from horizontal, and in some embodiments, 20 to 30 degrees, however other ranges may be utilized. The conveyor 36 includes a series of parallel and closely spaced apart cylindrically shaped rollers 31 (FIG. 3) of conventional type which are freely rotatable about their longitudinal axes, as for example, on conventional bearings. The tops of the rollers 31 define a conveying surface, which support the tie plates 30. The conveyor 36 may include a conveyor frame 39 defined by one or more frame structural elements which support the rollers 31. In the instant embodiment, the frame 39 is defined by a first structural element 19 and a second structural element 19 which are positioned opposite one another and extend in a longitudinal direction pertaining to a feed direction of the tie plates 30. The rollers 31 are suitably journaled in opposing and parallel extending side beams or rails of the frame 39. While the instant embodiment shows generally flat plate structures, other structures may be used, for non-limiting example channel, angle iron shapes, or box/rectangular shapes may be used to define the frame 39 and support the rollers 31. Additionally, these or other structures may be joined, for example by welding, or by additional structures in order to define a one piece frame.

The tie plates 30 thus are conveyed by gravity along the rollers 31 until intercepted by a dispensing device at the lower end of the tie plate dispenser 12. The tie plate dispenser 12 may be towed behind a rail car, rail truck or other tow vehicle. The tie plate dispenser 12 is typically angled from top to bottom to aid in feeding the tie plates 30 toward the lower discharge end 35 and the tie plate dispenser 12 is supported by railroad wheels 29.

In one alternative, an inclined chute with a metal base could be utilized as the conveyor 36 provided it is operatively inclined at a sufficient angle to assure that the tie plates 30 placed on an upper input end thereof will readily slide downwardly along the base and subsequent release to the track bed. Clearly, the angle of incline in such a chute would need to be greater than that of the conveyor 36. In other embodiments the conveyor 36 may be embodied by a vibratory feeder instead of the rollers or the chute. As used herein, the term conveyor may include, but is not limited to, any of these examples of structures which move tie plates—roller conveyor, powered conveyor, belt conveyor, chute, vibratory feeder, combinations of any of these or other structure which generally move a part from a first position to a second position, or the like.

The tie plates 30 freely gravitates off of a lower output end of the conveyor 36 for disposition along the railroad tracks 14 in any of the previously discussed arrangements for disposal. Accordingly, once the dispenser 12 is indexed so as to drop one of the plates 30, either on one of the ties 18, or mid-way between two adjacent ties, or at or near ends of the railroad ties 18. One skilled in the art will realize that the dropping of tie plates 30 may be indexed relative to the distance traveled by the tie plate dispenser or distributor 12.

The tie plate dispenser 12 further comprises a guide 40. The guide 40 is a longitudinally extending structure or combination of structures that extends in the direction of the tie plate movement along the conveyor 36. The guide 40 is depicted as flat stock in some embodiments, but may be other structural shapes as well. For example, the guide 40 may also be embodied by the flat stock or may further comprise a beam to which the flat stock is connected, wherein the beam may be connected to the support 26 or may be connected to adjustable actuators as described further herein.

At a first end 42 of the guide 40, the guide is tapered from a narrow width. The first end 42 provides a narrow width in order to increase the likelihood of positioning the first guide end 42 between the shoulders 32 of the tie plate 30. As shown, the tie plate 30 located at the narrow end is out of alignment relative to the direction of movement. However, the guide 40 will correct the skewed tie plate 30 as it moves along the tie plate conveyor 36.

Referring still to FIG. 3, the tie plates may be enter the dispenser 12 askew. When this occurs, the narrow first guide end 42 still engages the tie plate 30 (nearest first end 42) between the shoulders 32. Briefly, the tie plates 30 may be of varying sizes and varying shapes. Many tie plates 30 are rectangular in shape as illustrated and may comprise two shoulders 32 are extending from the upper surface of the tie plate. According to some examples, the shoulders 32 provide a locating and alignment feature for positioning of a railroad track in order to connect the track or rail to the railroad tie. Some tie plates may have a single shoulder 32 while some may have two as depicted. The number is not to be considered limiting, however, the guide 40 may use at least one, or two, shoulder in order to align the tie plates 30, rather than the outer edges of the tie plates. By relying on the outer edges, the positioning and alignment is then partially dependent on outer dimensions, and therefore alignment may vary where batches of multiple sized tie plates are utilized. Thus where two shoulders are used, the alignment may be independent of tie plate dimension and use of multiple sizes of tie plates may not affect the operation.

As the guide 40 widens from the first end 42 to its full width, the tie plate 30 will rotate to it proper alignment and position on the conveyor 36. The rotation is due to engagement between the shoulders 32 and guide 40. Further, the guide 40 retains the tie plate 30 in desired position laterally along the conveyor 36, while the tie plate 30 continues moving longitudinally along the conveyor 36. It should be understood that some tolerance is necessary to allow for movement of the tie plates 30, rather than stoppage, during use of the dispenser 12.

The guide 40 may be supported in a number of ways. According to some embodiments, the guide 40 is supported from above by the supports 26. In such a way, the guide 40 is disposed at a height or gap 41 above the conveying surface 22. This defines a gap defined between the rollers 31 and the guide 40, wherein the tie plate 30 may be disposed and move through toward the second end of the dispenser 12. The gap 41 is sized so that the guide 40 is positioned between the shoulders 32 of a tie plate 30 and at a height so not to stop movement of the tie plate therebetween. As one skilled in the art will understand, the tie plates 30 may be formed in differing sizes and accordingly, may have heights or thicknesses which differ. For example, some tie plates may have a thickness of up to ¾ of an inch while other size tie plates may have a thickness of about ⅞ of an inch. These dimensions are merely examples and others may be utilized, and therefore should not be considered limiting.

The guide 40 may also be adjustably supported so that the height of the guide 40 may be changed relative to the conveying surface 22 below. Therefore, the adjustability of the guide in a height or vertical dimension may allow for appropriate clearance of tie plates of differing sizes which improves usage of the dispenser. For example, a guide actuator 126 may be mounted to each of the supports 26 in order to move the guide 40 vertically and vary the height relative to the conveying surface 22. The one or more actuators 126 may be supported at various locations along the conveyor path for raising and lowering the guide 40. The guide actuator 126 may be fixed to a frame member, structure, or other support 26 of the dispenser 12 and may have a piston or other movable structure which connects to the guide 40. In this way, the movement of the piston in a vertical direction will move the guide 40 vertically. The guide actuator 126 may be electrical, hydraulic, pneumatic, combinations, or other movable structures. Likewise, the guide actuator 126 may have a motor for example which rotates to cause linear motion of an actuation element alternative to typical to a piston.

At the lower output end of the conveyor 36, the guide 40, for example, extends over the opening 24. According to some embodiments, a mechanism is provided to retain the last sequential tie plate 30 over the opening 24. In some embodiments the retaining mechanism 60 may be a magnet, permanent or electromagnet, in order to retain the tie plate 30. In the embodiment comprising a permanent magnet, the at least one magnet retains the tie plate 30 and the movement of the subsequent tie plates along the dispenser forces the tie plate to a position fully over the opening and retained by the magnet. Alternately, if an electromagnet is used, the magnet may be turned off then on when the tie plate is in the desired position over the opening.

Some embodiments provide at least one permanent magnet 60. In the instant embodiment, the at least one permanent magnet 60 is defined by three circular magnets, for non-limiting example. Other shapes and sizes may be used, depending at least in part on the size of the opening. The magnets 60 are shown sized to fit between longitudinal edges of the guide 40.

Figure 6:
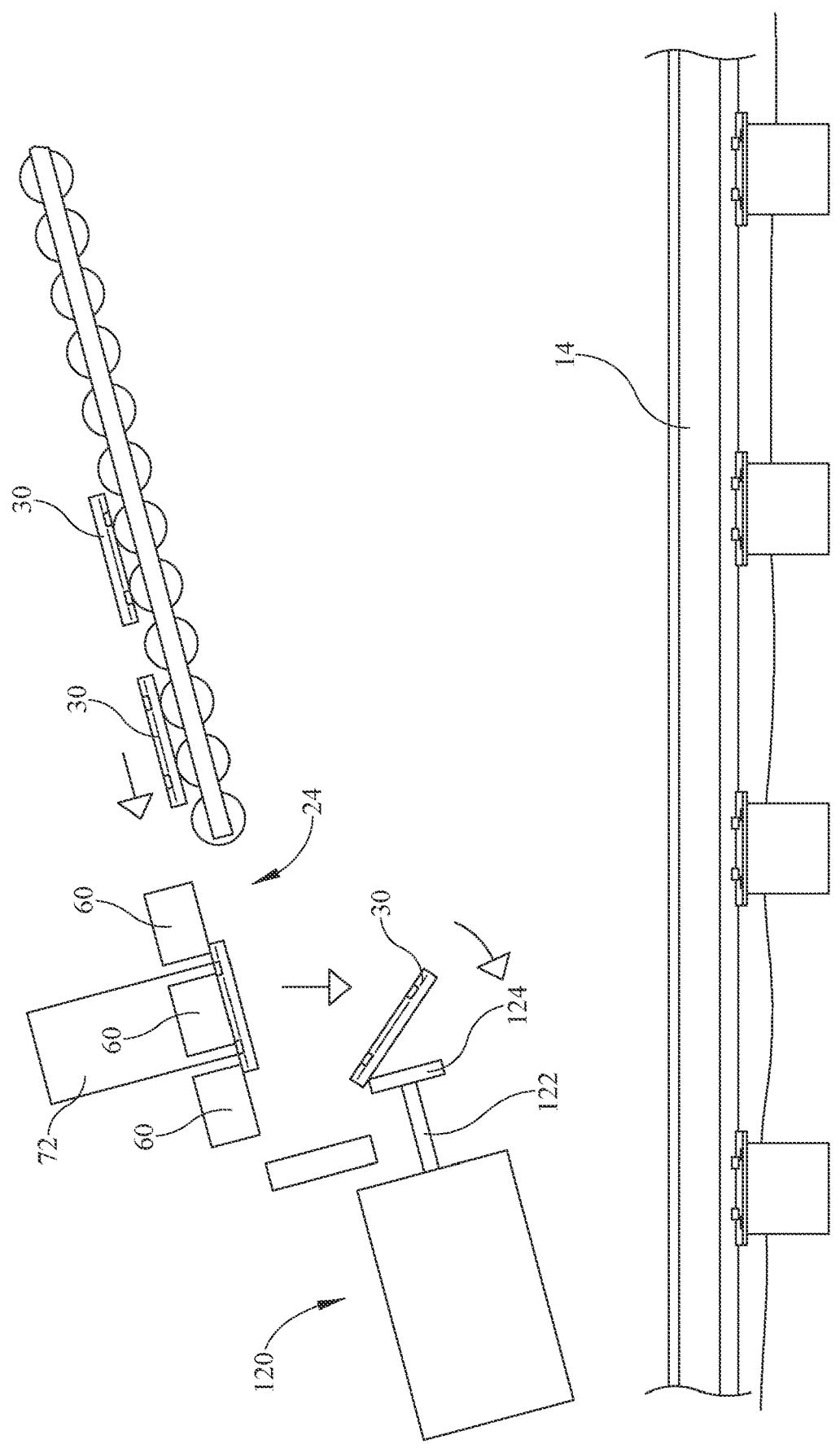
FIG. 6 is a second schematic sequence following the first sequence of FIG. 5.

In the depicted embodiment having a permanent magnet 60, an actuator assembly 70 is used to disengage the tie plate from the at least one magnet 60 and thereby discharge the tie plate on to the railroad track assembly. The instant embodiment utilizes an actuator assembly 70 to move downward and displace the tie plate 30 from the at least one magnet 60, thus causing the tie plate to fall. As shown in FIG. 6, the actuator assembly 70 may utilize a hammer 72 which passes through, or around, the guide 40 to push the tie plate 30 downward from the guide 40 through opening 24. The hammer 72 may take various forms and according to the instant embodiment, the hammer may comprise vertical structures passing through or around the guide to push the tie plate 30 over the opening 24 away from the at least one magnet 60.

In some other embodiments, the magnet may be movable through a structure, for example the guide 40. In such embodiment, when the magnet 60 is retracted, the tie plate 30 cannot move upward beyond the guide or other structure, and the tie plate 30 is separated from the magnet 60. In a similar alternate embodiment, the hammer 72 may move through structure, for example while the magnet 60 is below the guide 40 and retaining the tie plate 30 in position for discharge. By actuation, the hammer 72 may move through the guide 40 and force the tie plate 30 to separate from the magnet 60, and thus to be discharged. In still other embodiments, for example where the magnet is an electromagnet, the magnet may simply be powered off to drop the tie plate 30. An actuator may be optionally used in such embodiment.

In some embodiments, the conveyor 36 may pivot from near an upper end, so that the lower end may be located at any of various locations relative to the railroad tie 18, tie plates thereon, or the ground below. For example, a hitch ball and/or fifth wheel arrangement may be used. In alternative embodiments, the conveyor 36 may be constructed to slide rather than pivot, so that the tie plates 30 may be dispensed at various locations relative to the ties, tie plates, or the ground.

Figure 4:
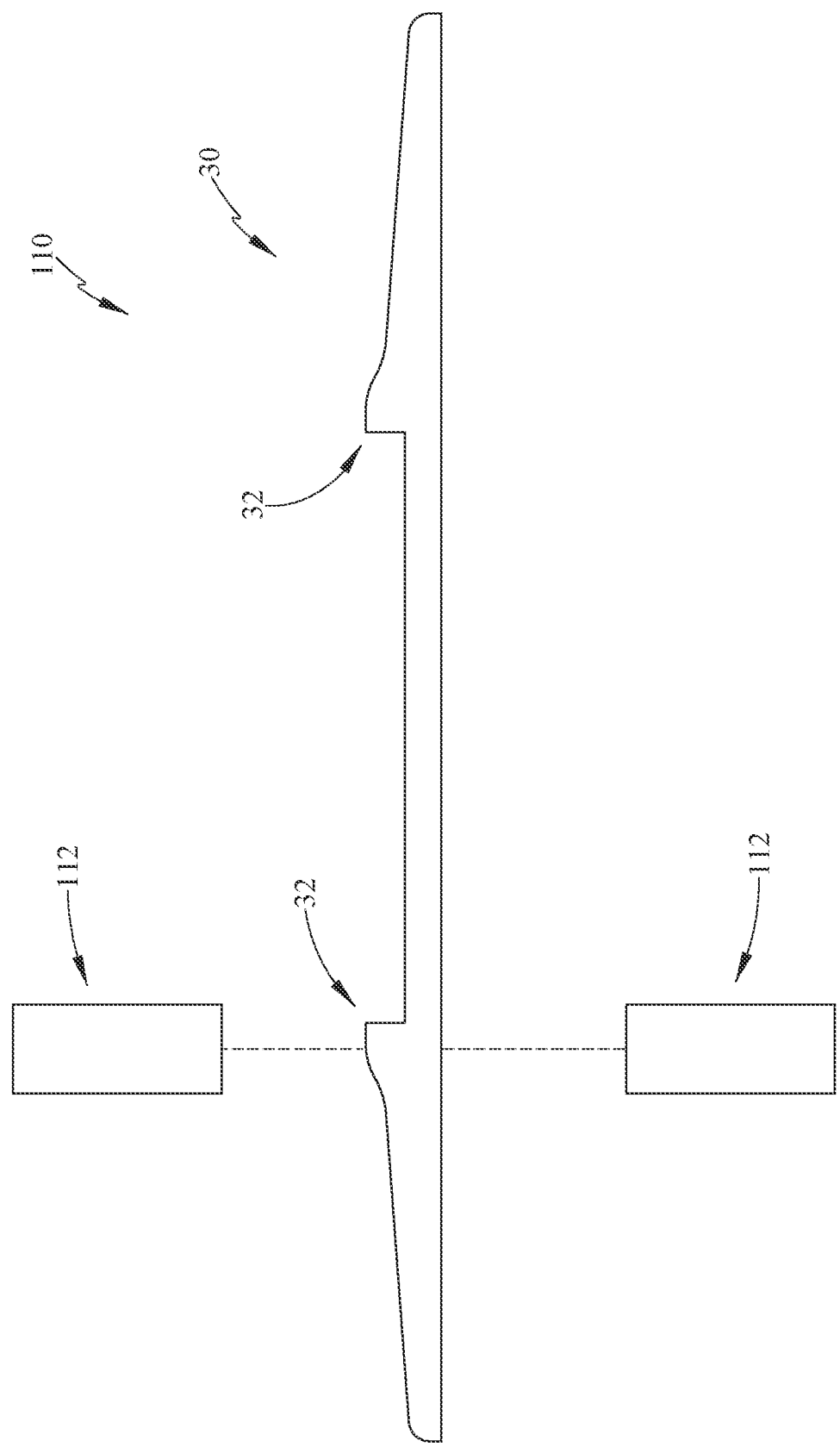
FIG. 4 is a schematic representation of a tie plate and sensor arrangement.

With reference to FIG. 4, a further embodiment of the tie plate dispenser 12 is provided, wherein the orientation of the tie plates 30 may be adjusted for dispensing on the railroad system. As mentioned, some companies may desire tie plates 30 be positioned for further work in a right side up orientation, or in an upside down orientation, for example if further handling and flipping is to occur by an additional piece of handling equipment. Therefore, at or near the actuator assembly 70, a tie plate flipping assembly 110 may be provided.

In order to position the tie plates 30 in the desired orientation on the railroad system, the current position of the tie plates 30 should first be determined. In order to do this, a sensor 112 may be utilized. The sensor 112 may be various types of sensors including, but not limited to, proximity sensor such as an ultrasonic, inductive, capacitive or others. The sensor 112 may further comprise a limit switch, a laser, or an optical sensor. The sensor 112 may be one or more sensors and may be looking for a signal based on a position of a shoulder.

As shown in the schematic view, the sensor 112 may be positioned above the tie plates 30 or may be placed below the tie plates 30. The sensor 112 is a looking for a surface, for example a lower flat surface of the tie plate 30. Alternatively, the sensor 112 may be looking for the shoulders 32 of the tie plates 30. In some embodiments, where two or more sensors 112 are used, the sensors 112 may be looking for both the shoulder(s) 32 and a flat surface to make a determination and confirmation of the current orientation of the tie plate 30.

As shown in the view of FIG. 4, the sensor 112 may be disposed above the tie plate 30, below the tie plate 30, or in some embodiments, below. The sensor 112 may be aligned with the opening 24 (FIG. 3) or may be offset from the opening 24 in order to ensure that the sensor 112 is not impacted when the tie plate 30 is discharged through the opening. Additionally, the sensor 112 may be disposed on the arm 122 or finger 124 (both FIG. 5).

Figure 5:
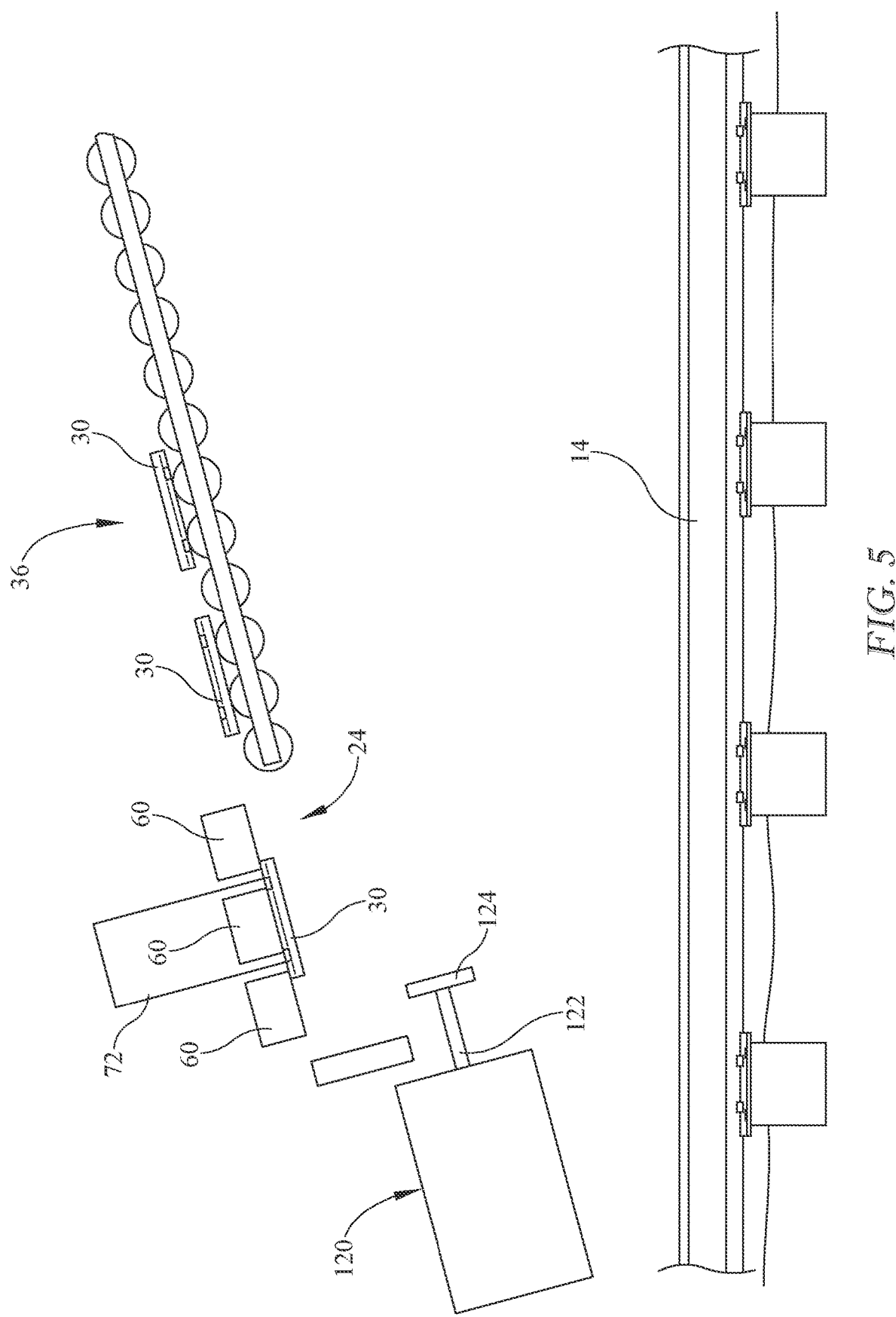
FIG. 5 is a schematic representation of an example structure to change orientation of a tie plate being disposed on a railroad system and in a first sequence.

Referring now to FIG. 5, a further embodiment is provided wherein the tie plate 30 may be flipped to alter the orientation if determined necessary. With the sensor 112 determining the instant orientation of the tie plate 30, the tie plate 30 may need to be flipped depending on how the tie plate 30 is needed on the railroad systems. In the side view of FIG. 5, an embodiment is shown wherein an actuator 120 is provided near the opening 24, in this instance below. The actuator 120 has an arm 122 which extends and retracts. In some embodiments, the arm 122 may be a part of the actuator 120, such as a piston, or the arm 122 may be connected to the actuator 120. In the instant embodiment, the arm 122 further comprises a finger 124 which engages the tie plate 30.

As shown in the extended position, the arm 122 extends into an area beneath the opening 24 and through which the tie plate 30 will fall when the hammer 72 detaches the tie plate 30 from the at least one magnet 60. During the fall, the tie plate 30 will engage the arm 122 or finger 124, causing the tie plate 30 to flip from its orientation above the opening 24 to the orientation desired when on the railroad system.

The actuator 120 and the arm 122 should be positioned at a height such that the falling tie plate 30 has ample room to flip if needed. In other words, the tie plate 30 cannot be discharged at such a low height that the tie plate 30 cannot flip over. This may be achieved by adjustment of the discharge height of the lower end of conveyor 36 and/or adjustment of the position where the actuator 120 engages the tie plate 30 being discharged from the conveyor 36.

Referring now to FIG. 6, the tie plate 30 at the opening 24 is released by actuation of the hammer 72. As a result, the magnets 60 cannot retain the tie plate shown falling. Based on a previous sensor 112 determination, the actuator 120 is extended because a tie plate is in a position requiring orientation change. As the tie plate 30 falls, the tie plate engages the finger 124.

Figure 7:
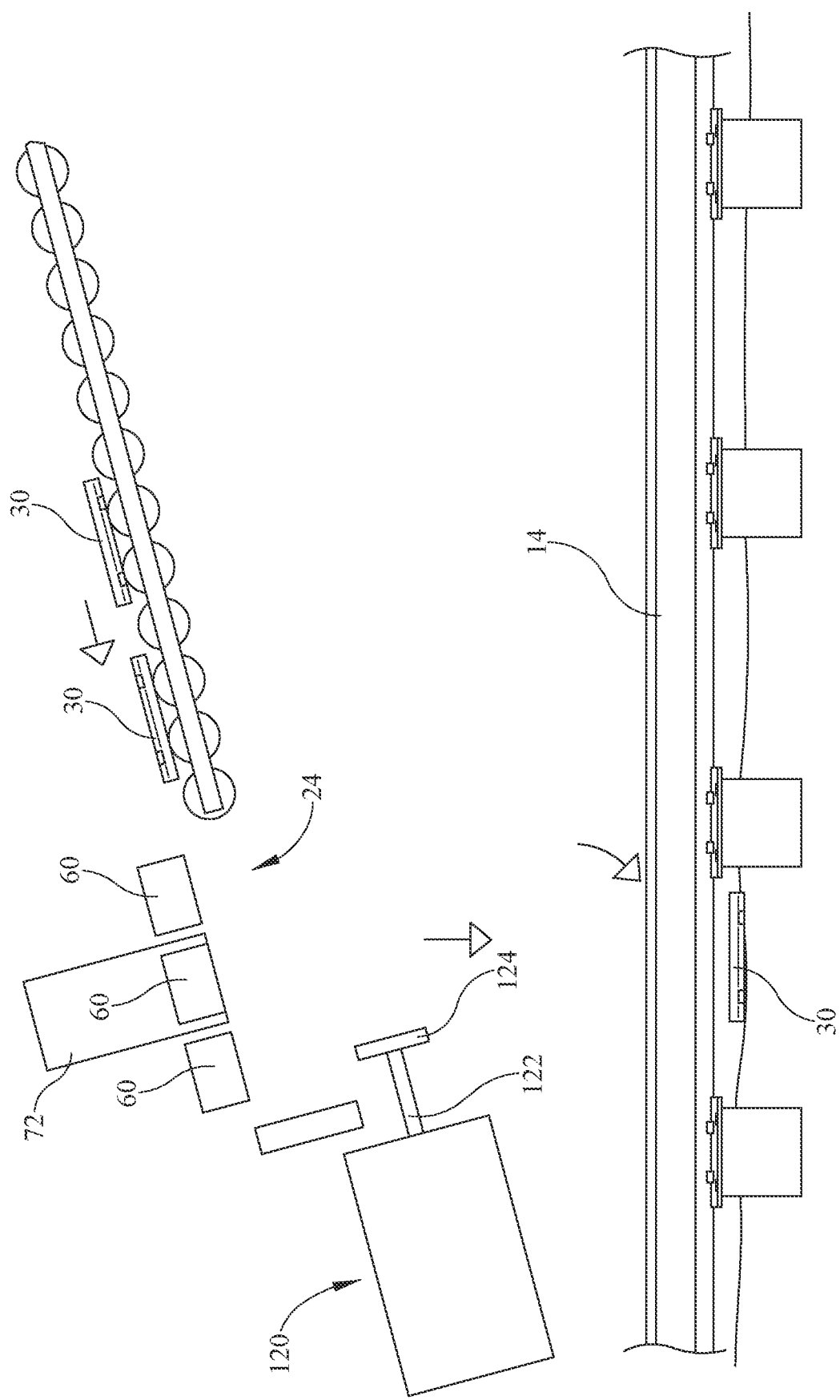
FIG. 7 is a third schematic sequence following the second sequence of FIG. 6.

Referring to FIG. 7, the tie plate 30 is shown on the railroad system and is in an orientation opposite that which was on the tie plate dispenser 12 (FIG. 3). The process can start again with the next subsequent tie plate 30: determine tie plate orientation, determine if the tie plate needs to be flipped, if yes then extend the actuator 120, and release the tie plate.

The actuator 120 may be placed in various positions to that it extends horizontally, for example forward to rearward direction, or vice-versa, side to side, or at an angle to enter the pathway of discharge for the tie plate 30. The actuator 120 may also be a pivoting actuator which rotates into a pathway of the tie plate discharge and rotates out of this position as well. The actuator 120 may also extend at an angle. Various positions may be used such that the arm 122 extends into this position.

Figure 8:
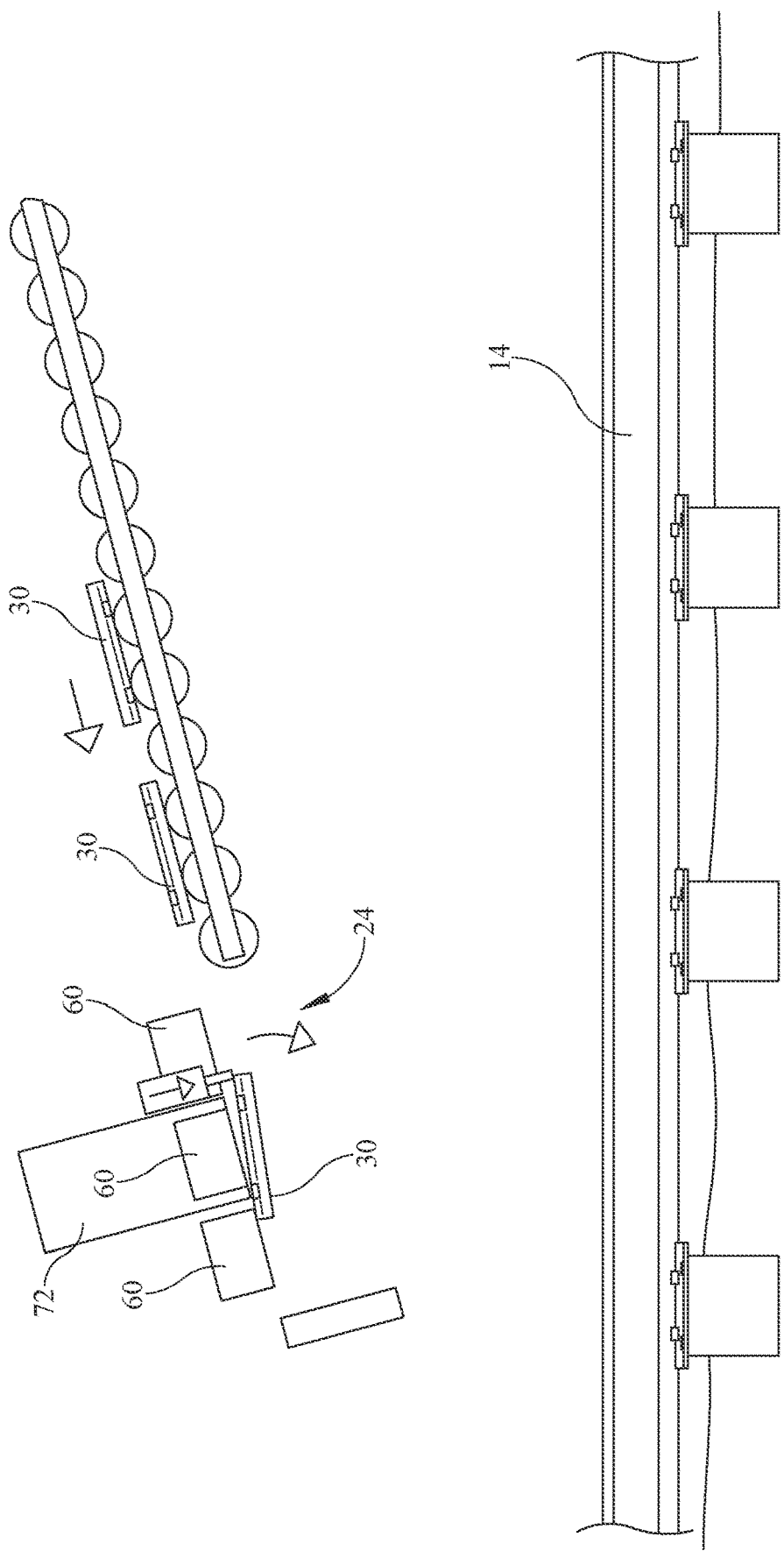
FIG. 8 is a schematic representation of a second example structure for changing orientation of a tie plate being disposed on a railroad system.

Referring now to FIG. 8, a further embodiment is provided. In this embodiment, the actuator 120 is removed and the tie plate orientation is changed in an alternate manner. In this embodiment, a force is applied at one side or edge of the tie plate 30. The force may be by way of a secondary hammer, actuator, or other device which breaks the magnetic attraction of the magnets 60 and the tie plate 30 over the opening 24. With the force applied to only one side or edge, the tie plate 30 begins to pivot or rotate as it falls, because the opposite side or edge is still magnetically connected to the magnets 60.

Figure 9:
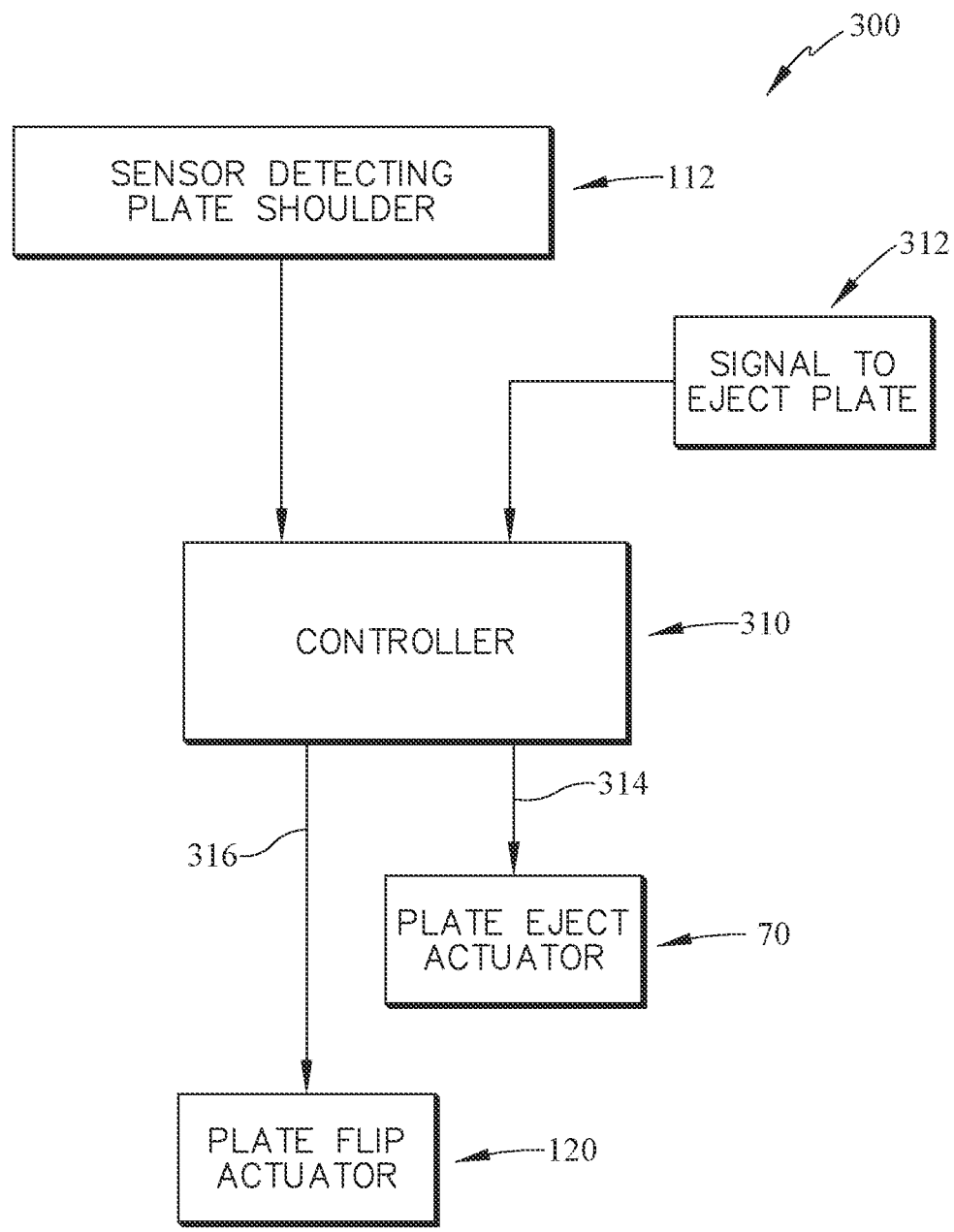
FIG. 9 is a schematic representation of the control system.

With reference to FIG. 9, a schematic view of a control system 300. The system comprises a programmable logic controller (PLC) 310. Various types of controllers could be utilized including microprocessors or other electronic devices which may be programmed. The sensor 112 is shown connected to the controller 310 and an arrow head depicts the signal input to the controller 310. The controller 310 can determine based on that signal, the orientation of the tie plate 30 over the opening 24.

The controller 310 may also receive a signal 312 to eject a plate. This may come from a sensor which detects a tie plate 30 over the opening 24, or it may be a manual signal from a worker. Either way, the automated or manual signal may both indicate to the controller 310 that a tie plate 30 is in position for ejection.

Once the controller 310 has either of the two signals described, the controller 310 may output two signals. One signal 314 may be to the actuator assembly 70 in order to eject a tie plate 30 from the opening 24. A second signal 316 may be to the tie plate flip actuator 120. As previously described, where the tie plate 30 being ejected needs to be flipped for desired orientation, the actuator 120 is extended to cause the tie plate to change orientation. Alternatively, as described, this actuator 120 may also be of the type embodied in FIG. 8, which pushes the tie plate 30 along one edge or side.

Figure 10:
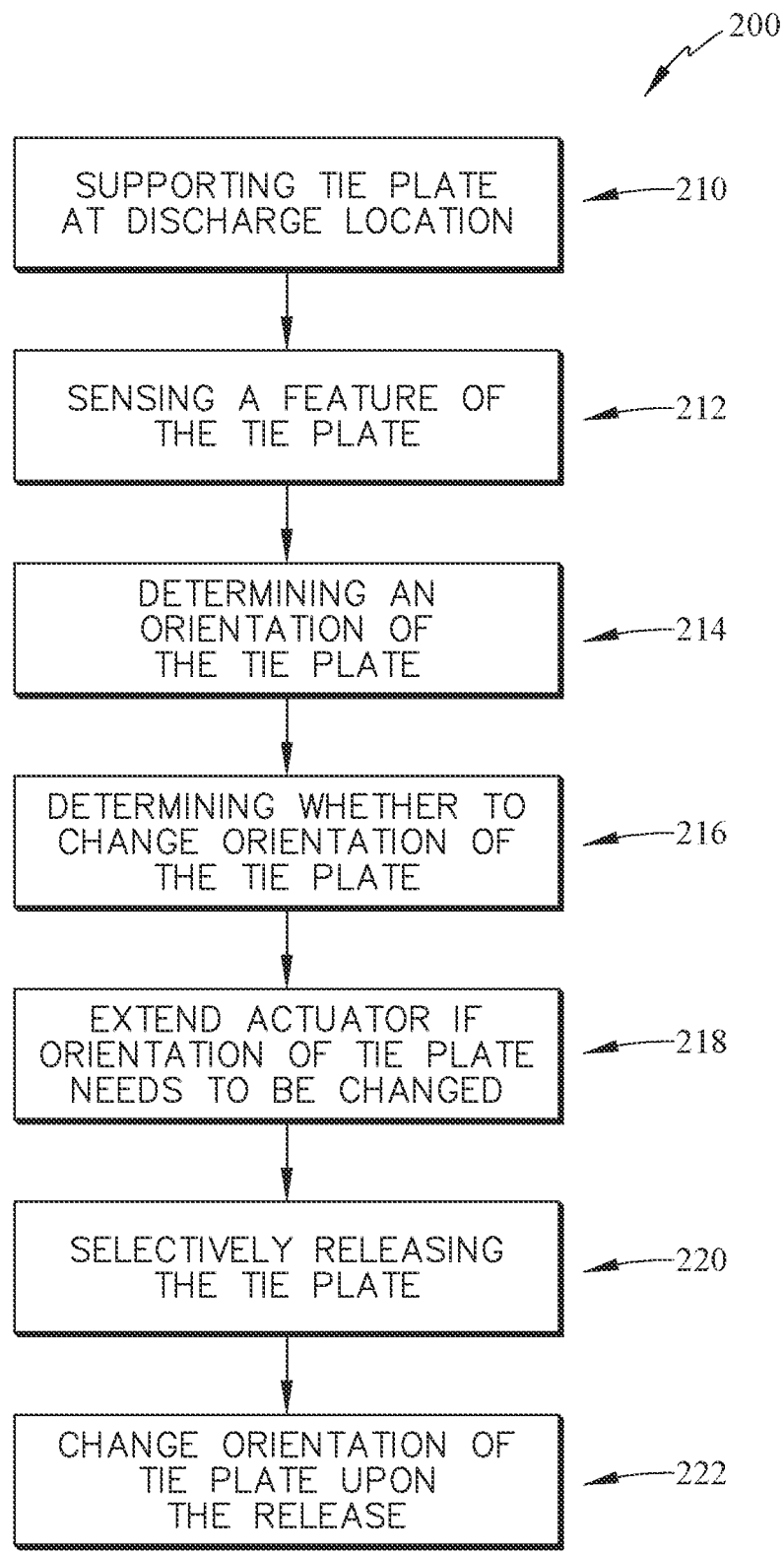
FIG. 10 is a flow chart depicting a method of operating the tie plate dispenser in order to change the orientation of the tie plates.

In reference to FIG. 10, a flowchart is shown providing a method or steps 200 for operating the tie plate dispenser 12. In a first step 210, a tie plate 30 to be discharged is positioned at a discharge location. In some embodiments, this location could be at an end of the conveyor or over an opening 24. This location should not be considered limiting.

In a second step 212, a sensor 112 senses a feature of the tie plate. For example, the sensor 112 may sense a shoulder, or a flat location, or both. As a result of this sensing, in the next step 214 the orientation of the tie plate is determined. That is, for example, is the tie plate 30 right side up or upside down.

In step 216, a determination is made on whether or not to change the orientation of the tie plate. This is done by determining whether to extend the actuator 120 based on the determination of step 214. If the determination in step 216 is to change the orientation, then in step 218, the actuator is extended into the pathway of the tie plate moving toward the railroad system.

In step 220, the tie plate is selectively released. This may be by actuating the hammer 72 or may be by turning off an electromagnet. If other retaining structures are used, those may be released mechanically, electrically, fluidically, or otherwise.

At step 222, the tie plate orientation is changed upon release of step 220, by engagement with the actuator.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A tie plate dispenser, comprising:
   a conveyor having a frame defined by one or more structural elements, and a plurality of rollers;
   said plurality of rollers capable of moving a plurality of tie plates from a first position to a second position along said conveyor;
   at least one magnet disposed at or near an end of said plurality of rollers and capable of magnetically sequentially engaging each tie plate of said plurality of tie plates as said each tie plate reaches a position of said conveyor adjacent to said at least one magnet;
   said plurality of tie plates are individually selectively released to fall from said at least one magnet to a location below said tie plate dispenser;
   an arm which is actuatable between a first position and a second position, wherein one of said first position or said second position is in a path that said each tie plate falls when selectively released from said at least one magnet;
   wherein said one of said first position or said second position causes said arm to engage each said tie plate along said path that each said tie plate falls.

2. The tie plate dispenser of claim 1, each of said plurality of rollers having circular cross section.

3. The tie plate dispenser of claim 2, said plurality of rollers defining a conveying surface.

4. The tie plate dispenser of claim 1 said at least one magnet being a permanent magnet or an electromagnet.

5. The tie plate dispenser of claim 4, further comprising an additional disengagement structure disposed to disengage said tie plate from said permanent magnet.

6. The tie plate dispenser of claim 1 further comprising a sensor which detects at least one feature of said tie plate.

7. The tie plate dispenser of claim 6, said arm being actuated depending on a detection of said at least one feature by said sensor.

8. A tie plate dispenser, comprising:
   a conveyor having a guide which sequentially moves tie plates from a first end toward a second end of said conveyor;
   a magnet disposed near said second end of said conveyor and configured to engage and retain each said tie plate near said second end of said conveyor;
   said magnet disposed at an elevation above said conveyor and configured to engage the tie plates that pass below said magnet;
   said magnet configured to release said tie plate at a preselected location along a falling path;
   an arm which is selectively actuatable along said falling path of each said tie plate, said arm movable between a first position and a second position, wherein in one of said first position or said second position said arm engages each said tie plate moving along said falling path;

the arm causing each said tie plate to change orientation upon engagement.

9. The tie plate dispenser of claim 8, said conveyor further comprising a plurality of rollers which support said tie plates.

10. The tie plate dispenser of claim 9, said magnet spaced from said plurality of rollers.

11. The tie plate dispenser of claim 10, further comprising said magnet being spaced from said conveyor to allow passage of each of said tie plates.

12. The tie plate dispenser of claim 8, said magnet being a permanent magnet or an electromagnet.

13. The tie plate dispenser of claim 8, further comprising said guide extending longitudinally along said conveyor.

14. The tie plate dispenser of claim 13, said guide being movable relative to a plurality of rollers of said conveyor to engage skewed tie plates of said tie plates.

15. The tie plate dispenser of claim 8, said conveyor being a roller conveyor, a powered conveyor, a belt conveyor, a chute, a vibratory feeder, or any combinations of any of these.

\* \* \* \* \*